3,519,056
METHOD OF MANUFACTURING A MOULD FOR CASTING METAL COMPRISING A MIXTURE OF MINERAL FIBRES AND CARBONISABLE RESIN
Robert Lewis Bickerdike, and Garyth Hughes, Farnham, England, assignors to National Research Development Corporation, London, England
No Drawing. Filed Mar. 28, 1968, Ser. No. 717,038
Claims priority, application Great Britain, Mar. 31, 1967, 14,841/67
Int. Cl. B22c 1/22, 9/12
U.S. Cl. 164—16    14 Claims

ABSTRACT OF THE DISCLOSURE

According to the invention a method of manufacturing a mould article for casting metal, such as iron, comprises the steps of forming a mixture of mineral fibres and carbonisable resin, feeding a charge of the mixture into a moulding tool to form a shaped charge, consolidat- shaped aticle in a non-oxidising atmosphee at a tempeing the charge and curing the resin to form a shaped article, removing the article from the mould, heating the shaped article in a non-oxidising atmosphere at a temperature and for a period sufficient to carbonise the resin, and, depositing carbon into the interstices of the shaped article by pyrolytic deposition by heating in a hydrocarbon containing atmosphere to produce a mould article.

---

This invention relates to a method of manufacturing a mould article for casting metal, such as iron, and a mould article produced by such method.

According to the invention a method of manufacturing a mould article for casting metal, such as iron, comprises the steps of forming a mixture of mineral fibres and carbonisable resin, feeding a charge of the mixture into a moulding tool to form a shaped charge, consolidating the charge and curing the resin to form a shaped article, removing the article from the mould, heating the shaped article in a non-oxidising atmosphere at a temperature and for a period sufficient to carbonise the resin, and, depositing carbon into the interstices of the shaped article by pyrolytic deposition by heating in a hydrocarbon containing atmosphere to produce a mould article.

The mineral fibres conveniently comprise non-organic refractory materials for example of the silicate, aluminate or oxide type, or silicon carbide or other refractory carbide fibres. Examples of mineral fibres which may be used are Fiberfrax (registered trade mark) Rocksil (registered trade mark), asbestos fibres, ziconia fibes, alumina fibres and mineral slagwool.

Preferably the resin treated mineral fibres are obtained by mixing together mineral fibres and the resin dissolved in a solvent carrier such as methylated spirits and a hardener such as hexamine.

Carbonisable resins for use in accordance with the invention may comprise cross-linking resins such as an epoxy, phenolic, Friedel-Crafts or furane type resin which are cured by heating or the addition of a catalyst.

The step of carbonising the shaped article typically comprises heating the article in a furnace in an inert atmosphere in which the temperature is raised to about 820° C. over a period of about 2 hours followed by pyrolytic deposition of carbon into the interstices of the shaped mineral fibre/carbonised resin article by heating the article at 800°–850° C. for typically 6 hours in an atmosphere containing a hydrocarbon.

In one preferred example according to the present invention 200 grams of Fiberfrax were mixed with 38 grams of phenol formaldehyde resin and 3.8 grams of hexamine in solution in methylated spirits until the methylated spirit had evaporated.

The resulting material was poured into a hollow metal moulding tool of the required shape and a pressure of 400 p.s.i. applied whilst the mould and contents were heated to 150°–180° C. to cure the resin. The resulting cured resin/mineral fibre shaped article was then removed from the moulding tool and had a density of 1.47 grams/cc. The shaped article was then heated in a furnace in an atmosphere of nitrogen to a temperature of 820° C. to carbonise the resin and the heating was continued in an atmosphere of nitrogen and benzene at 820° C. for 15 hours to obtain pyrolytic deposition of carbon from the furnace atmosphere into the interstices of the article.

The resulting article in the shape of a mould insert suitable for use in casting metal such as iron had a density of 1.58 grams/cc.

It is to be noted that a Friedel-Crafts type resin is formed from an aromatic compound with an aromatic linking agent which has two chloromethyl or methoxymethyl groups attached to an aromatic nucleus by means of a polycondensation reaction involving the nuclear hydrogen atoms and may be aided by the presence of a small amount of Friedel-Crafts type catalyst such as stannic chloride.

We claim:
1. A method of manufacturing a mould article for casting metal comprising the steps of
   (a) forming a mixture of mineral fibres and carbonisable resin,
   (b) feeding a charge of said mixture into a moulding tool to form a shaped charge,
   (c) consolidating the charge and at the same time curing the resin to form a shaped article,
   (d) removing the shaped article from the moulding tool,
   (e) heating the shaped article in a non-oxidising atmosphere at a temperature and for sufficient time to carbonise the resin, and,
   (f) heating the shaped article comprising said mineral fibres and said carbonised resin in a hydrocarbon containing atmosphere whereby carbon is deposited pyrolitically within the interstices of said article.

2. A method of manufacturing a mould article as claimed in claim 1 in which the mineral fibres comprise one of a group of fibres selected from the group consisting of silicate, aluminate, oxide or refractory carbide fibres.

3. A method of manufacturing a mould article as claimed in claim 1 in which the resin comprises a thermosetting resin selected from a group consisting of an epoxy, phenolic, Friedel-Crafts type resin formed from an aromatic compound with an aromatic linking agent which has two chloromethyl or methoxymethyl groups attached to an aromatic nucleus or furan type resin of which cure is effected by the application of heat.

4. A method of manufacturing a mould article as claimed in claim 1 in which the resin comprises a cold setting carbonisable resin of which cure is effected by the addition of a catalyst.

5. A method of manufacturing a mould article for casting metal comprising the steps of
   (a) forming a mixture of mineral fibres and thermosetting carbonisable resin, wherein said mineral fibres comprise one of a group of fibres selected from the group consisting of silicate, aluminate, oxide or refractory carbide fibres and said carbonisable resin comprising a thermosetting resin selected from the group consisting of an epoxy, phenolic, Friedel-Crafts type resin formed from an aromatic compound with an aromatic linking agent which has two chloromethyl or methoxymethyl groups attached to an aromatic nucleus or furane type resin, (b) feeding a charge of said mixture into a moulding tool to form a shaped charge, (c) consolidating the charge and heating it at the same time to cure the resin to form a shaped article, (d) removing the shaped article from the moulding tool, (e) heating the shaped article in a non-exodising atmosphere at a temperature and for sufficient time to carbonise the resin, and, (f) heating the shaped article comprising said mineral fibres and said carbonised resin in a hydrocarbon containing atmosphere whereby carbon is deposited pyrolitically within the interstices of said article.

6. A method of manufacturing a mould article for casting metal comprising the steps of (a) dissolving a quantity of thermosetting carbonisable resin in a solvent carrier with a hardener, (b) mixing said dissolved resin and hardener with a quantity of mineral fibres, (c) feeding a charge of said mixture into a moulding tool to form a shaped charge, (d) consolidating the charge and heating it at the same time to cure the resin to form a shaped article, (e) removing the shaped article from the moulding tool, (f) heating the shaped article in a non-oxidising atmosphere at a temperature and for sufficient time to carbonise the resin, and, (g) heating the shaped article comprising said mineral fibres and said carbonised resin in a hydrocarbon containing atmosphere whereby carbon is deposited pyrolitically within the interstices of said article.

7. A method of manufacturing a mould article as claimed in claim 6 and in which the mineral fibres comprise one of a group of fibres selected from the group consisting of silicate, aluminate, oxide or refractory carbide fibres.

8. A method of manufacturing a mould article as claimed in claim 6 and in which the thermosetting resin comprises a resin selected from the group consisting of epoxy, phenolic, Friedel-Crafts type resin formed from an aromatic compound with an aromatic linking agent which has two chloromethyl or methoxymethyl groups attached to an aromatic nucleus or furane type resin.

9. A method of manufacturing a mould article as claimed in claim 6 in which the mineral fibres comprise one of a group of fibres selected from the group consisting of silicate, aluminate, oxide or refractory carbide fibres and wherein the thermosetting resin comprises a resin selected from a group consisting of an epoxy, phenolic, Friedel-Crafts type resin formed from an aromatic compound with an aromatic linking agent which has two chloromethyl or methoxymethyl groups attached to an aromatic nucleus or furane type resin.

10. A method of manufacturing a mould article for casting metal as claimed in claim 6 in which the step of consolidating the charge and heating it at the same time to cure the resin to form a shaped article comprises applying a pressure to the charge of at least 400 lb./in.$^2$ and at the same time heating the charge to a temperature within the range of 150 to 180 degrees centigrade to cure the resin.

11. A method of manufacturing a mould article as claimed in claim 6 in which the step of carbonising the shaped article comprises heating said article in a furnace in an inert atmosphere to a carbonising temperature of about 820° C.

12. A method of manufacturing a mould article for casting metal as claimed in claim 6 in which the shaped charge is consolidated by applying a pressure to set charge of at least 400 lb./in.$^2$ and at the same time heating said charge to a temperature within the range of 150–180° C. to cure the resin and wherein said shaped article is carbonised by heating it in a furnace in an inert atmosphere to a temperature of about 820° C.

13. A method of manufacturing a mould article for casting metal comprising the steps of (a) dissolving a quantity of thermosetting carbonisable resin in a solvent carrier with a hardener, (b) forming a mixture of mineral fibres and said dissolved resin and hardener, (c) feeding a charge of said mixture into a moulding tool to form a shaped charge, (d) consolidating the charge by applying a pressure to the charge of at least 400 lb./in.$^2$ and at the same time heating said charge to a temperature of within the range 150–180° C. to cure the resin, (e) removing the shaped article from the moulding tool, (f) heating said shaped article in a non-oxidising atmosphere to a carbonising temperature and for sufficient time to carbonise the resin, (g) heating the shaped article comprising said mineral fibres and said carbonised resin in a hydrocarbon containing atmosphere at a temperature within the range of 800–850° C. for at least six hours whereby carbon is deposited pyrolitically within the interstices of said article.

14. A method of manufacturing a mould article for casting metal comprising the steps of (a) forming a mixture of mineral fibres, cold setting carbonisable resin, and catalytic curing agent, wherein said mineral fibres comprise one of a group of fibres selected from the group consisting of silicate, aluminate, oxide or refractory carbide fibres, (b) feeding a charge of said mixture into a moulding tool to form a shaped charge, (c) consolidating said charge as curing of the resin takes place to form a shaped article, (d) removing the shaped article from the moulding tool, (e) heating the shaped article in a non-oxidising atmosphere at a temperature and for sufficient time to carbonise the resin, and, (f) heating the shaped article comprising said mineral fibres and said carbonised resin in a hydrocarbon containing atmosphere whereby carbon is deposited pyrolitically within the interstices of said article.

References Cited

UNITED STATES PATENTS

| | | | |
|---|---|---|---|
| 2,913,788 | 11/1959 | Kramig | 164—138 X |
| 3,066,365 | 12/1962 | Moore | 164—23 |
| 3,077,413 | 2/1963 | Campbell | 164—41 X |
| 3,166,808 | 1/1965 | Moore | 164—41 X |
| 3,284,862 | 11/1966 | Schweikert | 164—361 |
| 3,374,825 | 3/1968 | Johnson | 164—43 X |

J. SPENCER OVERHOLSER, Primary Examiner

J. E. ROETHEL, Assistant Examiner

U.S. Cl. X.R.

164—43